May 13, 1947. J. M. STRANG 2,420,506
BINOCULAR RANGE ESTIMATING PERISCOPE OPERATING
ON THE COINCIDENCE PRINCIPLE
Filed May 25, 1943

John Martin Strang
Inventor
Hewitt Griggs Robertson
By
Attorney

Patented May 13, 1947

2,420,506

UNITED STATES PATENT OFFICE 2,420,506

BINOCULAR RANGE ESTIMATING PERISCOPE OPERATING ON THE COINCIDENCE PRINCIPLE

John Martin Strang, Glasgow, Scotland, assignor to Barr & Stroud, Limited, Glasgow, Scotland Application May 25, 1943, Serial No. 488,443
In Great Britain August 14, 1940

1 Claim. (Cl. 88—2.7)

This invention refers to a binocular range-estimating periscope operating on the coincidence principle and is concerned with instruments of what is known as the overlapping image type. In such instruments, two similar images of the object are presented to the observer's eye in the same image field, and range measurement is effected by the observer manipulating the instrument so as accurately to super-impose the two images.

For bringing the two images into position in the image field so that they can be superimposed, the two beams of light which are to form the two images are directed on to opposite sides of an obliquely disposed light transmitting and reflecting screen where each beam is partly transmitted through the screen and partly reflected at the screen, the reflected part of one beam and the transmitted part of the other beam leaving the screen together and passing into the eyepiece of the instrument. The one of these parts form the one image and the other forms the other image. The practice is for the screen surface to be partially metallised, usually aluminised or silvered.

A disadvantage of the overlapping image type of instrument in its existing form is the loss of light, the part of one beam transmitted at the screen and the part of the other beam reflected at the screen being lost.

The object of the present invention is to provide for the utilisation of that portion of the light which is thus ordinarily lost.

Under this invention, the instrument is provided with two eyepieces, one for each eye of the observer, and is so constructed that those portions of the two beams which are not directed to one of the eyepieces from the transmitting and reflecting screen are directed therefrom to the other eyepiece, so that, apart from transmission losses, the whole of the light of the two beams reaches the eyes of the observer.

In carrying the invention into practice, there is used a prism combination embodying a transmitting and reflecting screen and a secondary reflecting system which latter intercepts those portions of the two beams which are not directed from the screen into the one eyepiece and directs them into the other eyepiece.

The optical paths should be so arranged that the focal planes are substantially at equal distances from the base axis of the instrument.

Figure 1:
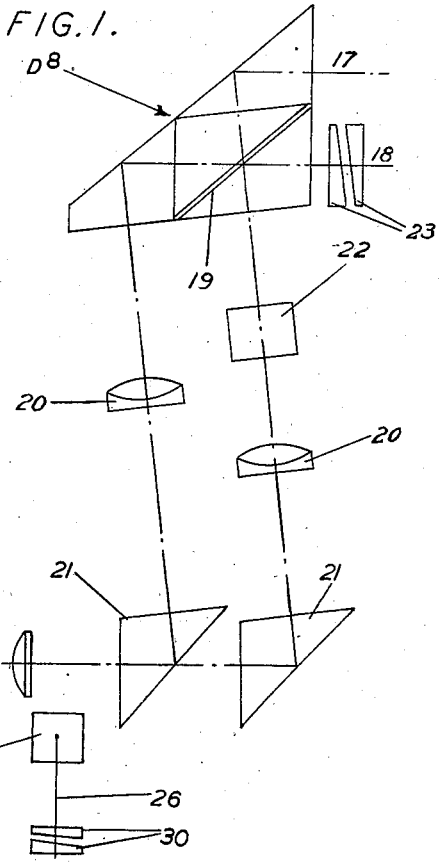
Figure 2:
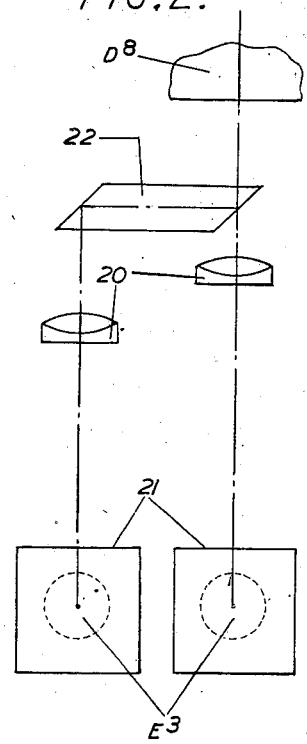
Figure 3:
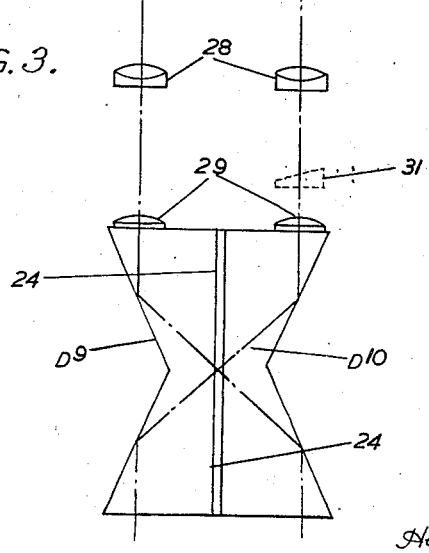

The invention will now be described with reference to the accompanying drawings, in which:

Figures 1 and 2 are two diagrammatic views showing the application of the invention to an inclinometer, and Figure 3 shows the application of the invention to a range-estimating periscope.

Referring to Figures 1 and 2, these show the application of the invention to an inclinometer, an inclinometer being, it will be understood, an instrument designed for measuring the parallax angle subtended at the instrument by a distant base and by means of which in gunnery at sea the course of target can be determined.

The two incoming beams of light from the two ends of the distant base are denoted by 17 and 18. These enter a prism combination $D^8$ which comprises a light transmitting and reflecting screen 19. The two beams of light emerging from the prism combination, each made up of a transmitted portion and a reflected portion, pass through objectives 20 and are directed by reflecting prisms 21 into binocular eyepiece systems $E^3$. These beams, as shown emerging from the prism combination $D^8$ in Figure 1, may be regarded as in the plane of the paper. In one of the beams emerging from the prism combination $D^8$ there is a step prism 22 adapted to displace or step that beam out of the plane of the paper into a parallel plane, see Figure 2, to bring it into line with the left hand eyepiece system $E^3$, the associated objective 20 and prism 21 being correspondingly displaced laterally relatively to those for the right hand eyepiece. A pair of prisms 23 rotatable in opposite senses about the axis of the incoming beam 18 are provided to effect image displacement for measuring purposes.

Figure 3 shows the upper part of a binocular periscope system adapted for estimation of range on the overlapping image principle. The optical system comprises a prism combination made up of two prisms $D^9$ and $D^{10}$ with a light transmitting and reflecting screen 24 between them. Two beams of light 25 and 26 are received by reflecting prisms 27 and directed downwards through objectives 28 to the prisms $D^9$ and $D^{10}$, each of which has a lens 29 cemented on its entrance face. The action of the prism combination will be clear. A part of each of the beams 25, 26, is reflected at the screen 24 and a part transmitted so that two beams emerge from the prism combination, each comprising the reflected portion of one beam and the transmitted portion of the other beam 25, 26. For effecting image displacement for measuring purposes, various means may be adopted. For example, the prisms 27 may be capable of differential rotation.

In another arrangement a pair of prisms 30 are provided in one of the beams, these being rotatable in opposite senses about the axis of that beam. As a still further alternative, there may be a deviating prism 31, movable along the beam.

We are aware that it has been proposed to construct a binocular range finder of the coincidence type in which each of the two beams of light from opposite ends of the base passes through two objectives, which are spaced apart, and through a half-opaque and half-transparent projector lens situated between the objectives and intended to give halving of the images, whereafter the beam is directed on to a semi-transparent screen where each beam is partly transmitted and partly reflected, the reflected portion of the one beam and the transmitted portion of the other beam being directed to one of the binocular eyepieces and the transmitted portion of the first beam and the reflected portion of the second beam being directed to the second eyepiece. In view of the multiplicity of air/glass surfaces, the loss of light in such an arrangement would be very high.

I claim:

A binocular range-estimating periscope operating on the overlapping image principle and comprising binocular eyepieces, two top reflectors to receive and reflect downwards two beams of light from a distant object, an objective in the downward path of each of said beams, and a prism combination made up of two halves symmetrical about a vertical plane, on which plane in the interior of the combination there is a reflecting-transmitting optical surface, the prism combination also having a horizontal entrance face and a horizontal exit face, and, in each half, between said entrance and exit faces, two oblique reflecting faces one above the other, the path of each downwardly directed beam being into one half of the combination at the entrance face, then meeting the upper oblique reflecting face of that half, then inwards to the reflecting-transmitting surface where some of the light is reflected outwards to the lower oblique face of that half and thence to one eyepiece, and some of the light is transmitted to the lower oblique face of the other half and thence to the other eyepiece, the reflected and transmitted portion combining to form overlapping images in the field of each eyepiece.

J. MARTIN STRANG.

REFERENCES CITED

The following references are of record in the file of this patent:

UNITED STATES PATENTS

| Number | Name | Date |
|---|---|---|
| 1,813,673 | Mihalyi | July 7, 1931 |
| 2,098,917 | Gunther | Nov. 9, 1937 |
| 1,062,166 | Konig | May 20, 1913 |
| 1,108,180 | Jacob | Aug. 25, 1914 |
| 1,021,306 | Eppenstein | Mar. 26, 1912 |
| 1,148,222 | Eppenstein | July 27, 1915 |
| 2,106,632 | Freund | Jan. 25, 1938 |
| 2,290,864 | Church | July 28, 1942 |
| 2,315,783 | Gilmore | Apr. 6, 1943 |

FOREIGN PATENTS

| Number | Country | Date |
|---|---|---|
| 674,777 | Germany | Apr. 21, 1939 |